(12) United States Patent
Minami et al.

(10) Patent No.: US 6,334,962 B1
(45) Date of Patent: Jan. 1, 2002

(54) LOW FLOW RATE MOISTURE SUPPLY PROCESS

(75) Inventors: Yukio Minami; Koji Kawada, both of Osaka; Yoshikazu Tanabe, Tokyo; Nobukazu Ikeda; Akihiro Morimoto, both of Osaka, all of (JP)

(73) Assignee: Fujikin Incorporated, Osaka (JP)

( * ) Notice: Subject to any disclaimer, the term of this patent is extended or adjusted under 35 U.S.C. 154(b) by 0 days.

(21) Appl. No.: 09/207,763

(22) Filed: Dec. 9, 1998

(30) Foreign Application Priority Data

Dec. 10, 1997 (JP) .................................................. 9-340283

(51) Int. Cl.[7] ...................................................... C01B 5/00
(52) U.S. Cl. ...................... 252/372; 423/580.1; 438/584; 438/590; 438/800
(58) Field of Search ................................ 423/580.1, 351; 252/372; 438/584, 590, 800

(56) References Cited

U.S. PATENT DOCUMENTS

| | | | | |
|---|---|---|---|---|
| 2,582,885 A | * | 1/1952 | Rosenblatt | 423/580.1 |
| 3,240,554 A | * | 3/1966 | Angerhofer | 252/372 |
| 3,535,074 A | * | 10/1970 | Nakashima | 423/580.1 |
| 3,630,956 A | * | 12/1971 | Benning et al. | 252/372 |

FOREIGN PATENT DOCUMENTS

| | | | | |
|---|---|---|---|---|
| GB | 858079 | * | 1/1961 | 423/580.1 |
| JP | 6-115903 | * | 4/1994 | 423/580.1 |

* cited by examiner

Primary Examiner—Wayne Langel
(74) Attorney, Agent, or Firm—Griffin & Szipl, P.C.

(57) ABSTRACT

A process of supplying moisture at low flow rates which permits high precision control of the flow of moisture to a semiconductor manufacturing line from an apparatus for the generation of moisture, characterized in that the flow of hydrogen to a moisture-generating reactor is controlled by means of a flow controller in such a way that an amount of hydrogen as fed is gradually increased from the start and reaches a specific set level such that when a specific time has passed, a predetermined rate of moisture begins to be produced and supplied to the semiconductor manufacturing line. The moisture is generated in the apparatus for generation of moisture in which hydrogen and oxygen are (a) fed into a reactor provided with a coat of platinum on the wall in the interior space, (b) enhanced in reactivity by the platinum catalytic action, and (c) caused to instantaneously react with each other at a temperature lower than the ignition point to produce moisture without undergoing combustion at a high temperature.

5 Claims, 9 Drawing Sheets

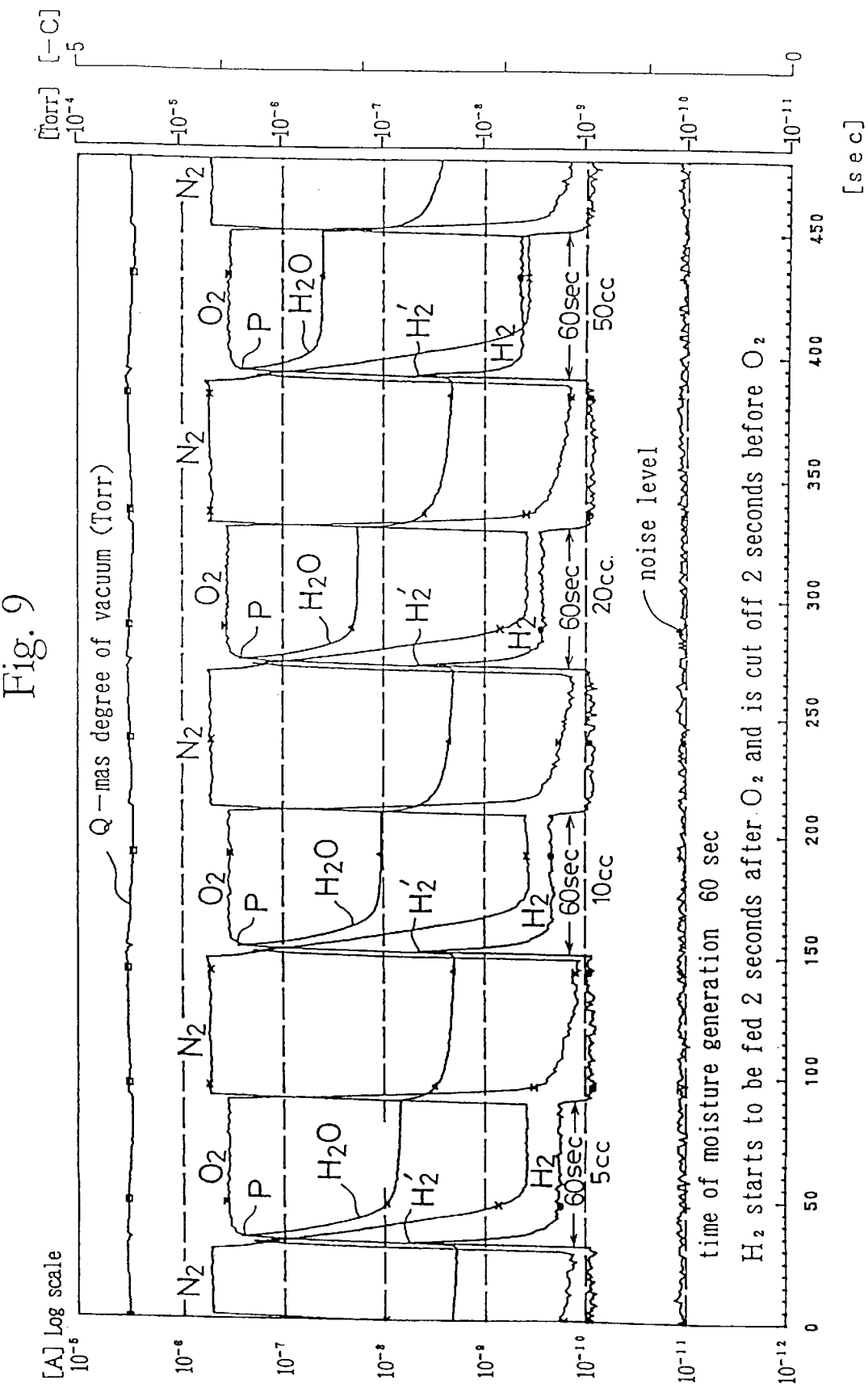

LOW FLOW RATE MOISTURE SUPPLY PROCESS

FIELD OF THE INVENTION

The present invention relates to an improvement of a low flow rate moisture feeding system for use especially in the production of semiconductors by the low moisture oxidation technique. More particularly, the present invention relates to the accurately controlled generation and supply of moisture in very small quantities.

BACKGROUND OF THE INVENTION

In the manufacture of semiconductor elements, the conventional so-called dry oxygen ($O_2$) oxidation technique for coating silicon oxide film by thermal oxidation is now largely replaced by the moisture oxidation technique, which is also called the wet oxygen oxidation method. That is because the silicon oxidation film formed by the moisture oxidation technique is superior to that obtained by the dry oxygen oxidation technique in properties such as insulation strength and masking effect.

Oxide film coating by the aforesaid moisture oxidation technique uses a mixed gas with a moisture content ($H_2O/O_2$) of, generally, approximately 20 to 30 percent. The amount of moisture to be mixed into oxygen is approximately 200 to 2000 cubic centimeters in terms of the standard state ("sccm"). That is, a relatively large quantity of moisture is fed from the reactor for the generation of moisture to the semiconductor manufacturing facilities.

FIG. 6 shows an example of the apparatus for the generation of moisture used in the moisture oxidation technique in current practice. In FIG. 6, $H_2$ represents hydrogen; $O_2$, oxygen; $N_2$, nitrogen gas for purging the system; $MFC_1$ to $MFC_5$, mass controllers; $V_1$ to $V_5$, valves; $T_1$ to $T_6$, thermocouples for measuring the temperature; $CV_1$ to $CV_5$, check valves; $F_1$ to $F_3$, filters; $H_0$ and $H_1$, gas preheater coils; $Mx_1$, oxygen-hydrogen mixer; $Mx_2$, oxygen-moisture mixer; 1, the reactor for the generation of moisture; and SM, processing equipment such as semiconductor manufacturing facilities.

As shown in FIG. 7, the aforesaid reactor 1 for the generation of moisture comprises reactor structural components 2 and 3 provided with a gas supply joint 4 and a moisture gas take-out joint 5, a reflector 9 on the inlet side provide inside the reactor 1 and opposite gas feed passage 4a of the reactor structural component 2, a reflector 12 on the outlet side provided inside the reactor 1 and opposite a moisture gas outlet passage 5a of the reactor structural component 3, a filter 10 provided in the middle of the reactor 1, and a platinum-coated catalyst layer 13 provided on the inside wall of the reactor structural component 3.

The platinum-coated catalyst layer 13, which is formed on the inside wall surface of the reactor structural component 3, is of a double layer construction, having a barrier coat 13a with a platinum coat 13b formed thereupon. The barrier coat 13a is formed of a nitride such as TiN, on which the platinum coat 13b is fixed by a vapor deposition technique or an ion coating technique.

Hydrogen and oxygen are fed into the reactor 1 through the gas feed passage 4a, diffused by gas diffusion means 8 comprising the inlet reflector unit 9, the filter 10, and the outlet reflector unit 12, and then come into contact with the platinum-coated catalyst layer 13. Upon coming into contact with the platinum-coated catalyst layer 13, hydrogen and oxygen are enhanced in reactivity by catalytic action and come to be in what is called the radicalized state. Radicalized, hydrogen and oxygen instantaneously react with each other at a temperature lower than the ignition point to produce moisture (i.e., water) without undergoing combustion at a high temperature.

The flow rates of hydrogen and oxygen which are fed into the reactor 1 are set properly to, for example, 1000 sccm : 600 sccm or so. Generally, a 20 percent oxygen rich material gas mixture of oxygen and hydrogen is sent into the reactor. The gas supply pressure of oxygen and hydrogen is set to 1.0 to 3.0 kg/cm² to produce approximately 1000 sccm of moisture. The reactor 1 for the generation of It is noted that the mass flow controllers $MFC_1$ to $MFC_5$ are generally constituted so that the flowing gas reaches a set flow rate as soon as possible. That is, the flow rate of the flowing oxygen or hydrogen gas rises to a set level within approximately one second after the start of the feeding of the gas.

The moisture generator illustrated in FIG. 6 can produce over approximately 1000 sccm of high-purity water. The amount of moisture to be generated and supplied can be controlled relatively easily with high precision by regulating the feeding of oxygen and hydrogen. Thus, the generator is excellent in practical usefulness. However, that moisture generator has problems yet to be solved. Of these, the foremost problem is the control of the flow rate of moisture when it is to be generated in very small quantities.

In recent years, what is called the low moisture oxidation technique is being put to wide practical application in the silicon oxide film coating by moisture oxidation. This low moisture oxidation is practiced using the mixture gas of oxygen and water with a moisture content of 1000 ppm –2 percent.

The moisture generator illustrated in FIG. 6, too, is required to regulate the generation of moisture at a very low rate, that is, one to 50 sccm, with high precision. With the moisture generator outlined in FIG. 6, a variety of inconveniences arise and it is virtually impossible to control the generation of moisture at such a low rate, which will be described later.

Shown in FIG. 8 is a testing apparatus developed to test the response characteristics or responsiveness of the reactor 1 for the generation of moisture. Experiments were conducted using this testing apparatus and the response characteristics of the reactor 1 for the generation of moisture were determined with the production of moisture kept at very low levels.

In FIG. 8, $MFC_1$ to $MFC_3$ indicate mass flow controllers; $V_1$ to $V_6$, valves; SV, a suction-regulating valve; E, a quadrupole mass spectrometer (Q-mass spectrometer); P, a vacuum pump (rotary pump); D, a turbo molecular pump; and R, a moisture-collecting reservoir. Moisture is condensed at room temperature, and the condensed moisture is collected. The mass flow controllers $MFC_1$ to $MFC_3$ are moisture is 114 mm in outside diameter, approximately 31 mm in thickness, and 86 cm³ in interior space with 99 cm² in a platinum-coated catalyst layer area. Though very small in size as shown, this reactor can turn out over 1000 sccm of moisture.

On the outlet side of the reactor is provided the aforementioned oxygen-moisture mixer $Mx_2$ where the moisture as generated can be mixed with oxygen in any desired ratio and diluted.

FIG. 6 illustrates an operation in which a 20 percent oxygen rich material gas mixture is fed into the reactor 1. The reactor 1 can also be operated with a hydrogen-rich material gas mixture. In such an arrangement, a hydrogen-moisture mixer $Mx_1$ is provide instead of the oxygen-moisture mixer $Mx_2$ as necessary.

The aforesaid gas preheater coils $H_0$ and $H_1$ are for heating the material gas mixture or oxygen respectively at not higher than approximately 200° C. The reactor 1 is also provided with a heater and, as necessary, a cooler so that if the reaction heat pushes up the temperature in the reactor in operation to over 500° C. (which rarely happens), the cooler will be activated to bring down the temperature below 500° C. In addition, the mixture in the mixer $Mx_2$ provided near the outlet of the reactor is constantly maintained at approximately 120° C. to prevent water from condensing on the pipe wall. A heater is provided as necessary.

Prior to starting up the reactor 1 for the generation of moisture, such equipment as the mass flow controllers $MFC_1$ to $MFC_5$ and temperature controllers first are prepared for operation, and the valves $V_2$ and $V_5$ are opened, and the valves $V_1$, $V_3$, and $V_4$ are closed to purge the system with nitrogen gas. Then the valves $V_2$ and $V_5$ are closed. At the same time or after the lapse of a certain time, $V_3$ and $V_4$ are opened to first feed oxygen into the system. At the same time that oxygen starts to be fed or after a certain time has lapsed after that, $V_1$ is opened to feed hydrogen into the system. In contact with the platinum-coated catalyst layer in the reactor 1, oxygen and hydrogen are radicalized to react with each other to produce approximately 1000 sccm of moisture gas, which is sent out to semiconductor manufacturing facilities SM. the so-called quick-start type mass flow controllers and are designed so that the level of hydrogen and oxygen will reach a specific set flow rate as soon as possible.

For determination of the start-up response characteristics of the reactor 1 for the generation of moisture, the flow rates of hydrogen, oxygen, and nitrogen were first set to the levels in four different cases as shown below by means of the mass flow controllers $MFC_1$ to $MFC_3$. In each case, the concentration of hydrogen, oxygen, and nitrogen in the generated moisture and the generated amount of water were determine using the Q-mass spectrometer E. The valves $V_1$ to $V_3$ were actuated in the following manner: At the start-up of the moisture generator 1, the valve $V_3$ was closed and the valve $V_2$ was opened. Two seconds later, $V_1$ was opened to produce moisture for one minute. When the moisture generation was to be ended, the valve $V_1$ was closed, and two seconds after that, the valve $V_2$ was closed and the valve $V_3$ was opened to feed nitrogen to the reactor 1. Part of the gas flowing out of the reactor 1 was led into the Q-mass spectrometer E and the determination was made of the concentration of hydrogen, oxygen, and nitrogen in the generated moisture and the generated amount of water at a measurement interval of about one second. The Q-mass spectrometer used was the model MSQ-150A Quadrupole Mass Analyzer manufacture by ULVAC CORPORATION of Japan. The supply pressure was set to gauge pressures of 2 kgf/cm² for hydrogen, 2 kgf/cm² for oxygen, and 7 kgf/cm² for nitrogen.

| Case 1 | $H_2$ = 5 sccm  | $O_2$ = 1.075 sccm | $N_2$ = 5.000 sccm |
| Case 2 | $H_2$ = 10 sccm | $O_2$ = 1.075 sccm | $N_2$ = 5.000 sccm |
| Case 3 | $H_2$ = 20 sccm | $O_2$ = 1.075 sccm | $N_2$ = 5.000 sccm |
| Case 4 | $H_2$ = 50 sccm | $O_2$ = 1.075 sccm | $N_2$ = 5.000 sccm |

FIG. 9 shows the results of the test carried out by the testing apparatus shown in FIG. 8 to test the moisture generation response characteristics of the prior art moisture generator. As illustrated in FIG. 9, the amount of generated moisture peaked at P in the same in every case. The reason why all four cases 1 to 4 peak at almost the same water level in the moisture generation response characteristics curve may be that some hydrogen remains trapped in the pipe line, the mass flow controller $MFC_1$, the valve $V_1$, and other parts in the hydrogen gas supply system when a cycle is over. Then, when the valve V1 is opened in the next cycle, this remnant hydrogen flows into the reactor 1 and reacts, turning into water, sending the moisture generation to the peak P.

In FIG. 9, the concentration curve of hydrogen peaks at $H_2'$. That is probably because part of the water led into the Q-mass spectrometer E will decompose into H2+ ions in a gas ionizer within the spectrometer E and those ions will be measured together.

In the arrangement of the prior art moisture generator as shown in FIG. 6, the amount of moisture generated is almost the same in the initial stage when the moisture generation is small. In other words, it was shown that it was impossible to control the concentration of water to be mixed, that is, the flow rate of water.

SUMMARY OF THE INVENTION

The present invention addresses those problems encountered with the prior art moisture generator. That is, the prior art cannot control the amount of moisture generation or the flow rate of moisture when the moisture generation per unit time is very small, and it is impossible to regulate water in the water mixture gas to be supplied to the respective processes in the semiconductor manufacturing facilities.

It is an object of the present invention to provide a process for feeding moisture at a very low flow rate which permits control with high precision of the flow and feeding of moisture at very low flow rates to a semiconductor manufacturing line.

One embodiment of the present invention provides a process for supplying moisture at a low flow rate for use in a moisture generator in which hydrogen and oxygen are fed into a reactor provided with a platinum coat on the wall in the interior space, enhanced in reactivity by the platinum catalytic action and caused to instantaneously react with each other at a temperature lower than the ignition point to produce moisture without undergoing combustion at a high temperature, characterized in that the flow to the rector of hydrogen is controlled by a flow controller in such a way that while oxygen is supplied to the reactor at a set flow rate, the supply to the reactor of hydrogen is started and gradually increased, reaching a specific set level in a specific time after the start of the feeding of hydrogen, thus producing and supplying moisture or a mixture of moisture with oxygen from the reactor to a semiconductor manufacturing line at a set flow rate.

Another embodiment of the present invention provides a process for supplying moisture at a low flow rate for use in a moisture generator of the same construction as described above, wherein the flow to the reactor of oxygen is controlled by a flow controller in such a way that while hydrogen is supplied to the reactor at a set flow rate, the supply to the reactor of oxygen is started and gradually increased, reaching a specific set level in a specific time after the start of the feeding of oxygen, thus producing and supplying moisture or its mixture with hydrogen from the reactor to a semiconductor manufacturing line at a set flow rate.

Still another embodiment of the present invention provides a process for supplying moisture at a low flow rate as described above, wherein the flow controller is so controlled that the flow of hydrogen or oxygen is raised to a specific set level at a nearly fixed rate of increase wherein time elapsed before the set flow rate level is reached is one to ten seconds.

Still one more embodiment of the present invention provides a process for supplying moisture at a low flow rate for use in a moisture generator in which hydrogen and oxygen are fed into a reactor provided with a platinum coat on the wall in the interior space, enhanced in reactivity by the platinum catalytic action and caused to instantaneously react with each other at a temperature lower than the ignition point to produce moisture without undergoing combustion at a high temperature, characterized in that an escape pipe provided with an escape valve is branched out from the outlet side of the reactor or moisture generator and that, with the escape valve left opened, hydrogen and oxygen are first fed into the reactor at specific rates to produce a specific amount of moisture in the reactor and then, with the escape valve closed, moisture or its mixture with oxygen or hydrogen is supplied from the reactor to the semiconductor manufacturing line at a set flow rate.

Yet another embodiment of the present invention provides a process for supplying moisture at a low flow rate for use in a moisture generator in which hydrogen and oxygen are fed into a reactor provided with a platinum coat on the wall in the interior space, enhanced in reactivity by the platinum catalytic action and caused to instantaneously react with each other at a temperature lower than the ignition point to produce moisture without undergoing combustion at a high temperature, characterized in that an escape pipe provided with an escape valve is branched out from the outlet side of the flow controller for control of the flow of hydrogen to the reactor and that while oxygen is being supplied at a set flow rate, the escape valve is first opened and hydrogen is fed, thus lowering the pressure on the secondary side of the flow controller, and then the escaped valve is closed to feed hydrogen into the reactor, whereby moisture or a mixture of moisture with oxygen is supplied form the reactor to the semiconductor manufacturing line at a set flow rate.

Finally, another embodiment of the present invention provides a process for supplying moisture at a low flow rate for use in a moisture generator of the same construction as in the fifth embodiment, wherein an escape pipe provided with an escape valve is branched off from the outlet side of a flow controller for control of the flow rate of oxygen flowing to the reactor, and wherein while hydrogen is being supplied at a set flow rate, the escape valve is first opened and oxygen is fed, thus lowering the pressure on the secondary side of the flow controller and then the escape valve is closed to feed oxygen into the reactor, whereby moisture or a mixture of moisture with hydrogen is supplied from the reactor to the semiconductor manufacturing line at a set flow rate.

BRIEF DESCRIPTION OF THE DRAWINGS

FIG. 9 depicts moisture generation response characteristics curves, illustrating the results of the response characteristics test by the testing arrangement shown in FIG. 6.

DESCRIPTION OF PREFERRED EMBODIMENTS

Specific, non-limiting, examples of the present invention are described below, with reference to the drawings.

EXAMPLE 1

Figure 1:
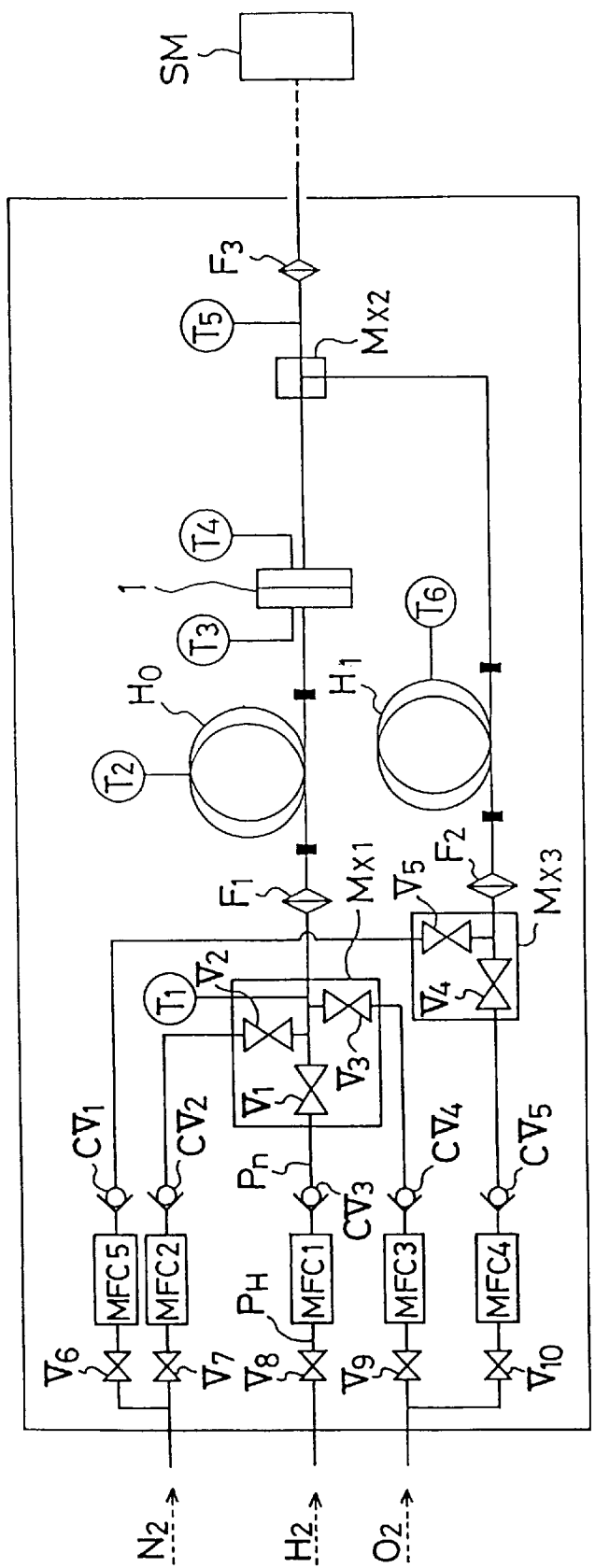
FIG. 1 is a system diagram of a moisture generator to practice the first example of the present invention.
Figure 6:
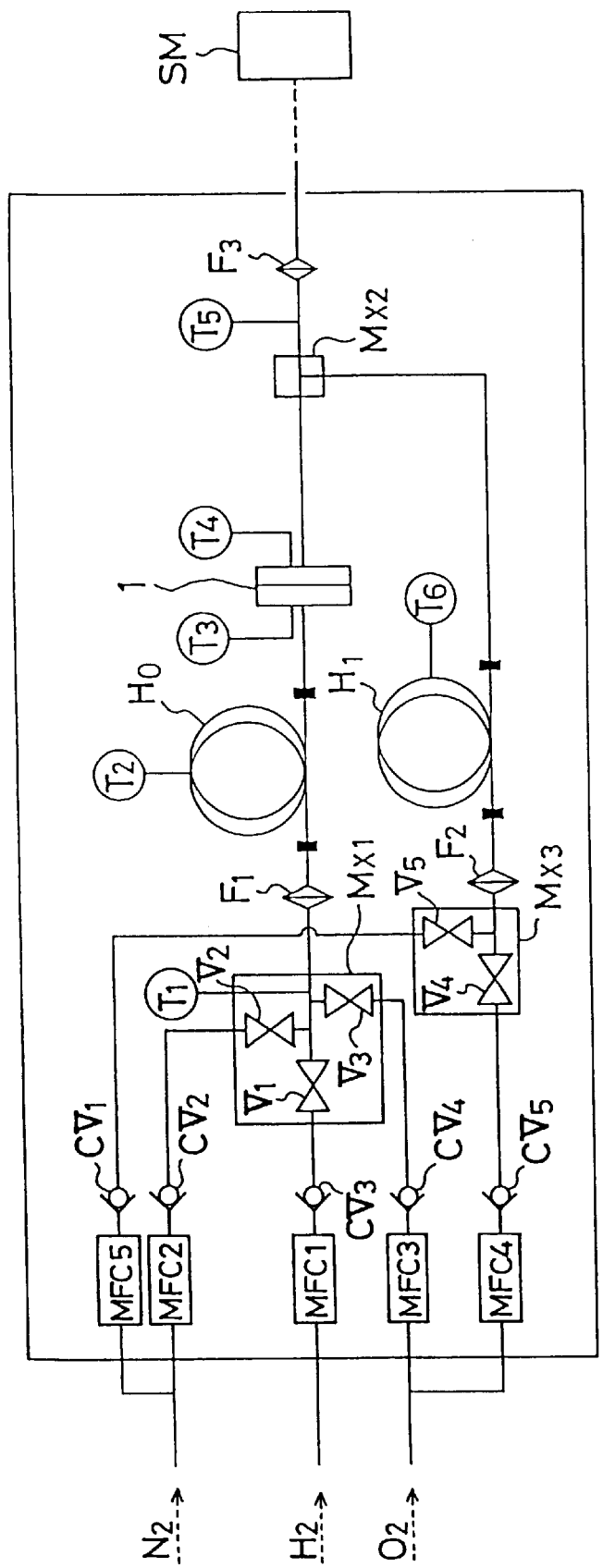
FIG. 6 is a system diagram of an example of a prior art apparatus for the generation of moisture.
Figure 7:
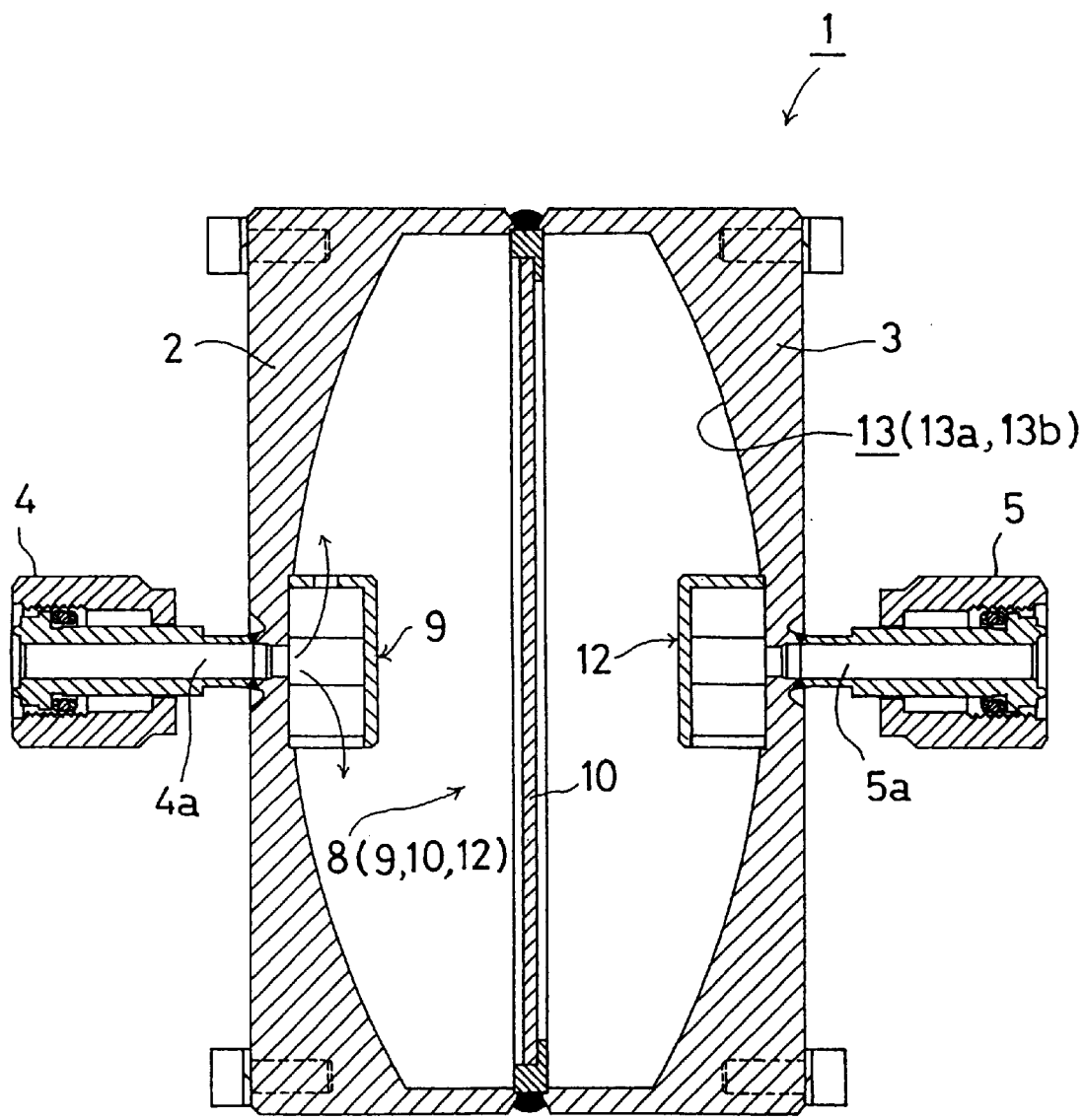
FIG. 7 is a vertical section of an example of a prior art apparatus for the generation of moisture.
Figure 8:
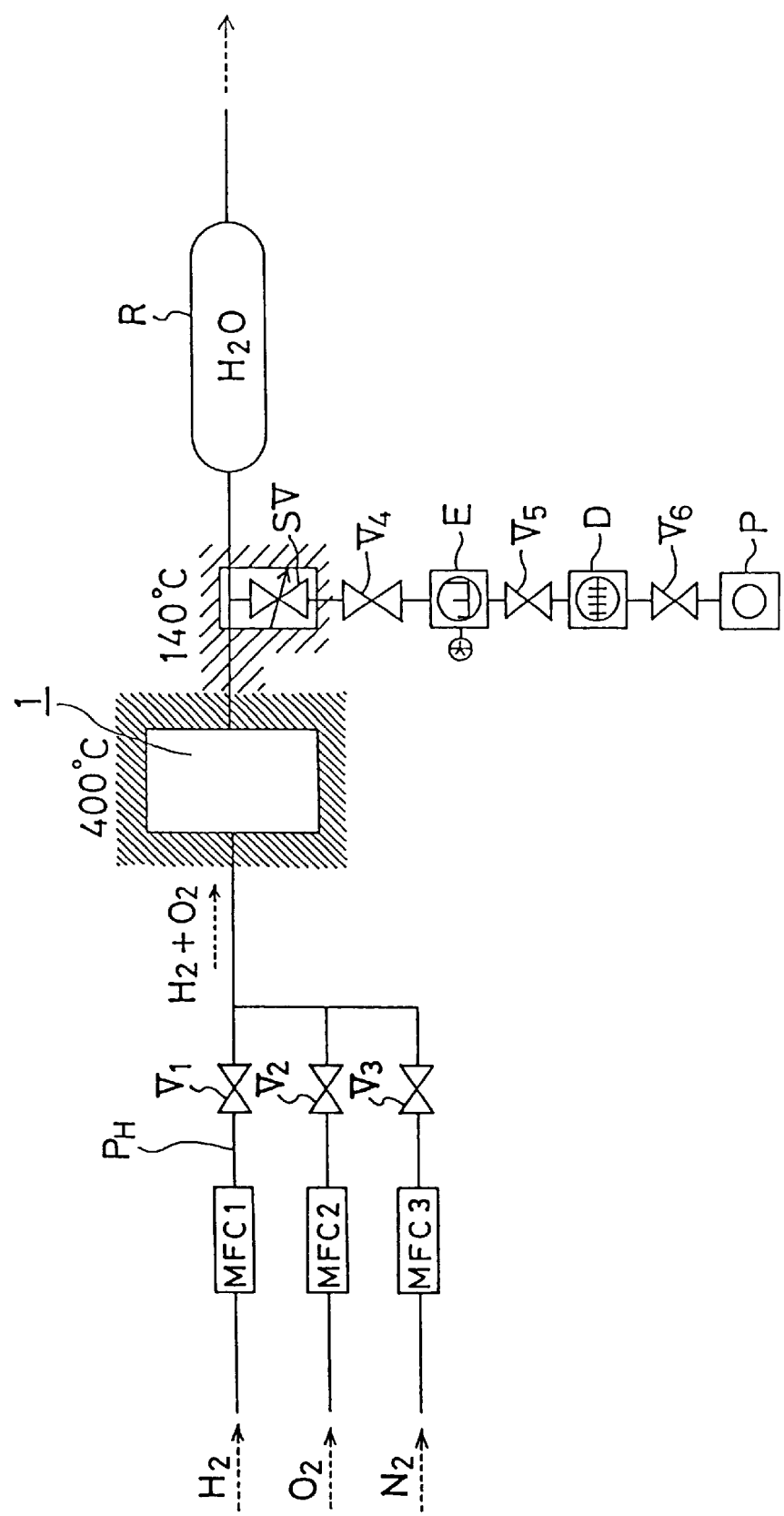
FIG. 8 is a schematic diagram showing an experimental arrangement to test the response characteristics of the apparatus for the generation of moisture outlined in FIG. 6.

FIG. 1 is a system diagram of a moisture generator suitable for practice of the first example of the present invention. In FIG. 1, the reference $H_2$ indicates hydrogen; $O_2$, oxygen; $N_2$, nitrogen; $MFC_1$ to $MFC_5$, flow controllers such as mass controllers; $V_1$ to $V_{10}$, valves; $T_1$ to $T_6$, thermocouples for measurement of temperature; $CV_1$ to $CV_5$, check valves; $F_1$ to $F_3$, filters; $H_1$ and $H_2$, gas heater coils; $Mx_1$, oxygen-hydrogen mixer; $Mx_2$, oxygen-water mixer; 1, a reactor for the generation of moisture; and SM, semiconductor manufacturing facilities such as an oxidation chamber to which the generated moisture is supplied. This moisture generator is identical to the one shown in FIG. 6 except that this generator is provided with valves $V_6$ to $V_{10}$ and uses a gradually-opening, or slow-start, mass flow controller $MFC_1$ as the mass flow controller.

The mass flow controller $MFC_1$ on the hydrogen gas supply line in the present embodiment is constituted so that after hydrogen gas has started to be supplied to the primary, or upstream, side at a pressure of 1.0 to 3.0 kgf/cm², the flow rate of hydrogen on the secondary, or downstream, side is gradually increased and reaches a specific level in some one to ten seconds, in what is called the slow-start type. Also, a valve $V_8$ is provided on the inlet side of the mass flow controller $MFC_1$ on the hydrogen supply line. By connecting this valve $V_8$ directly to the mass flow controller $MFC_1$, the dead space between the two is minimized.

To start up the reactor 1 for the generation of moisture, such components as the mass flow controllers $MFC_1$ to $MFC_5$ and the temperature controllers are first prepared for operation. Then, the valves $V_2$, $V_7$, $V_5$, and $V_6$ are opened and the valves $V_1$, $V_8$, $V_3$, $V_9$, $V_4$, and $V_{10}$ are closed to purge the system with nitrogen. After, the valves $V_2$ and $V_5$ are closed, and at the same time or after the lapse of a certain time, the valves $V_3$, $V_9$, $V_4$, and $V_{10}$ are opened to feed oxygen into the system.

At the same time as oxygen starts to be fed or within a specific time (some one to three seconds) after that, the valves $V_1$ and $V_8$ are opened to feed hydrogen into the system. As the valves $V_1$ and $V_8$ are opened, hydrogen begins to flow into the reactor 1 for the generation of moisture. As mentioned above, however, the mass flow controller $MFC_1$ is of the slow-start type, and the hydrogen that flows through the valve $V_1$ to mix with oxygen is not increased as suddenly as in the prior art system, but instead increases gradually according to the flow increase rate set by the mass flow controller $MFC_1$. In the present example, the hydrogen flow increase rate set by the aforesaid mass flow controller $MFC_1$ is determined so that the set flow rate, about 1 sccm to about 50 sccm, will be reached in some one to ten seconds. Therefore, remaining hydrogen trapped in interior spaces of the mass flow controller $MFC_1$, the pipeline Pn, and the valve $V_1$ will not be pushed into the oxygen all at once.

Figure 2:
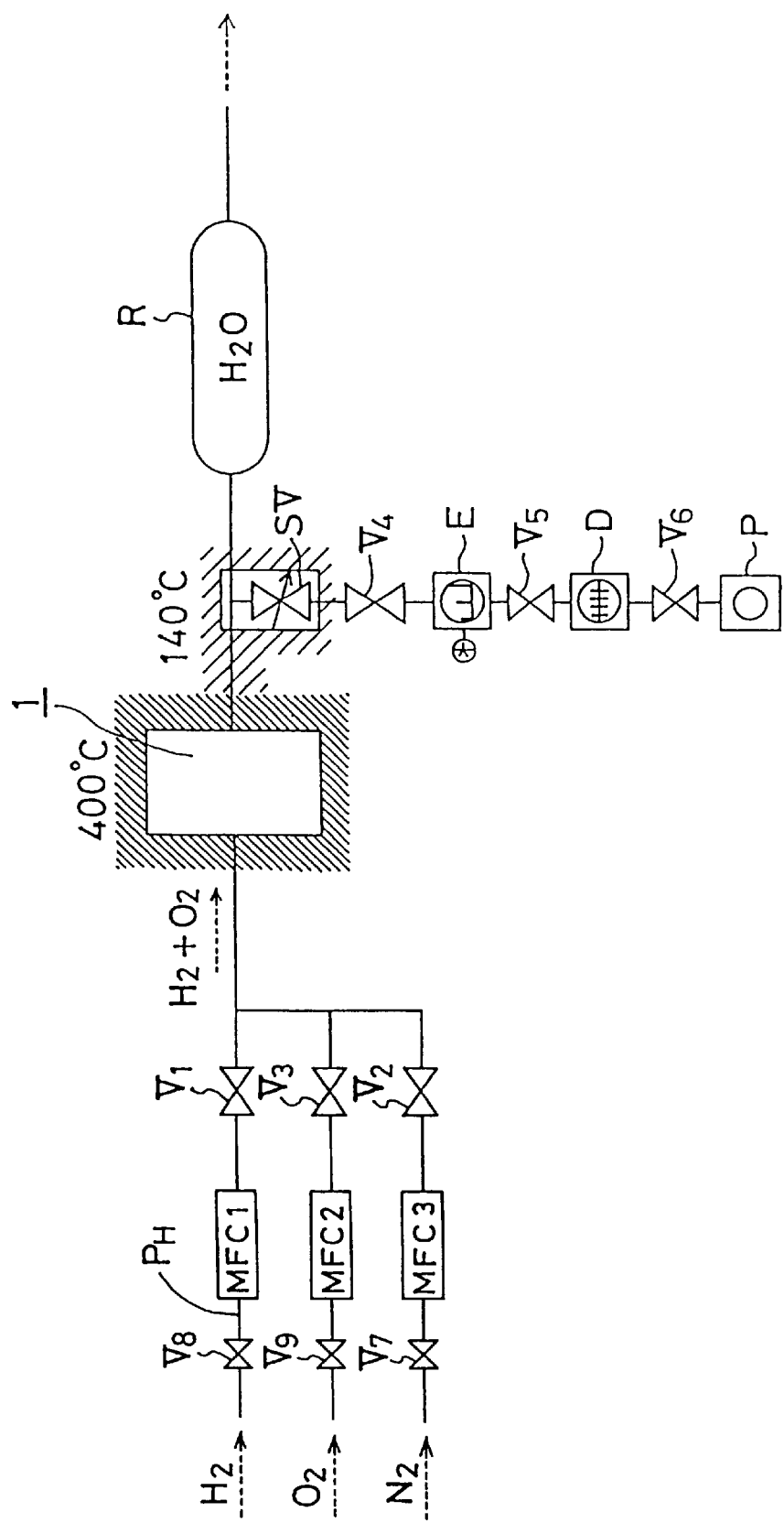
FIG. 2 is a schematic diagram of the experimental arrangement designed to test the response characteristics of the apparatus for the generation of moisture used to practice the first example of the present invention.
Figure 3:
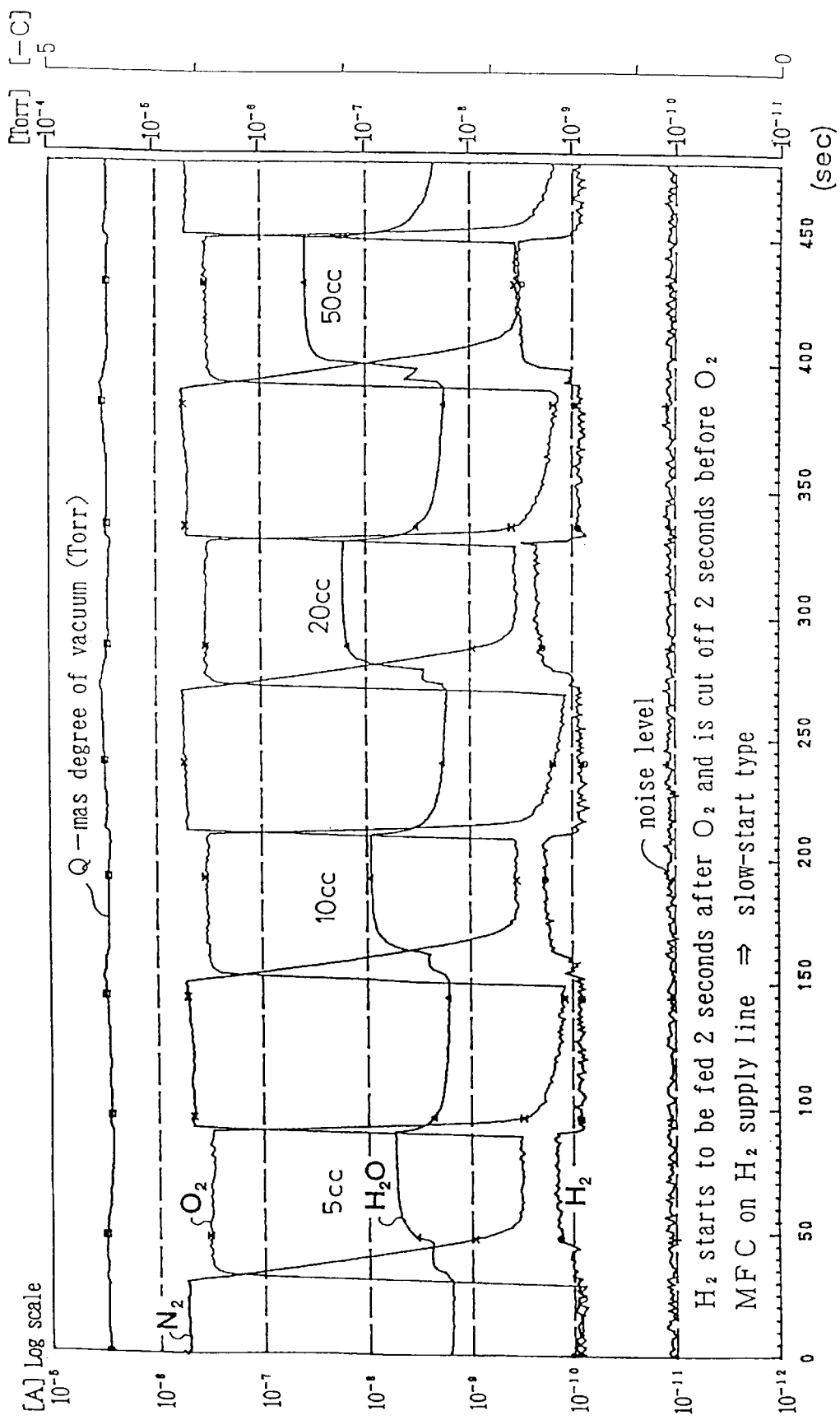
FIG. 3 depicts moisture generation response characteristics curves, illustrating the results of the response characteristics test by the testing arrangement shown in FIG. 2.

FIG. 3 shows the moisture generation response characteristics curves obtained with the reactor 1 for the generation of moisture in the experimental arrangement shown in FIG. 2, in which the slow-start type mass controller was used as mass flow controller $MFC_1$. In this experiment, the valves were actuated in this manner: At the startup, the valves $V_2$ and $V_7$ were closed while the valves $V_3$ and $V_9$ were opened. Two seconds later, the valves $V_1$ and $V_8$ were opened. In terminating the operation, the valves $V_1$ and $V_8$ were closed, and two seconds later the valves $V_3$ and $V_9$ were closed and the valves $V_2$ and $V_7$ were opened. The other conditions, including the amount of hydrogen supplied, were the same as those in the testing of the response characteristics shown in FIG. 9, and in addition, flow increase rate determined by the mass flow controller $MFC_1$ was set so that the flow rate of hydrogen would increase and reach the set levels of 5, 10, 20, and 50 sccm from 0 sccm in approximately 5 seconds.

It was confirmed that in the operation by the process of supplying moisture in the first example of the present invention, the initial generation of hydrogen is regulated at the respective set levels—5 sccm, 10 sccm, 20 sccm, or 50 sccm—as is clear from FIG. 3. Thus the moisture generation, that is, the flow rate of the moisture supply to a semiconductor manufacturing line, can be controlled with high precision.

The first example of the present invention as shown in FIG. 1 and FIG. 2 relates to what is called the oxygen-rich generation of moisture, in which a relatively large amount of oxygen and a relatively small amount of hydrogen are fed into the reactor 1 and a mixture of oxygen and moisture flows out of the moisture outlet. It is confirmed that the hydrogen-rich generation of moisture in which a relatively large amount of hydrogen and a relatively small amount of oxygen are fed into the reactor 1 and a mixture of hydrogen and moisture flows out of the moisture outlet, too, can be controlled with high precision as in the oxygen-rich operation, even when the moisture generation is small at 5 sccm to 50 sccm or so. This is accomplished by regulating the supply of oxygen using the slow-start or gradually opening flow controller so that the flow rate reaches a specific flow level form 0 sccm in a certain time (one to ten seconds).

In the example of FIGS. 1 and 2, a conventional mass flow controller is used. The flow controller may be of any type, including a pressure-type flow controller.

The first example relates to the oxygen-rich generation of moisture. The present invention is not limited to that embodiment. The present invention likewise includes, for instance, operations in which hydrogen and oxygen are fed into the reactor 1 at a ratio of 2:1 and substantially moisture alone flows out of the moisture outlet.

EXAMPLE 2

Figure 4:
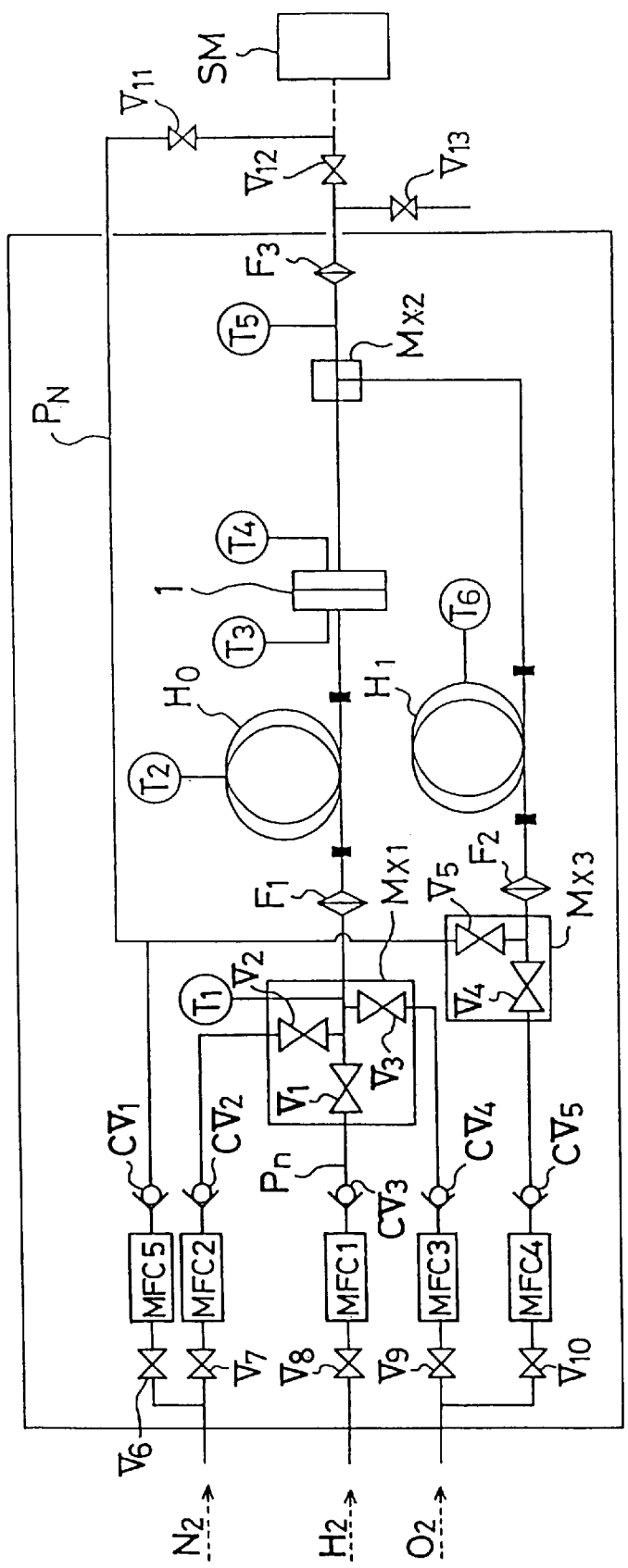
FIG. 4 is a system diagram of a moisture generator to practice the second example of the present invention.

FIG. 4 shows the configuration of the apparatus for the generation of moisture used in the second example of the present invention. In the second example, a branch pipe S is provided on the moisture outlet side of the apparatus for the generation of moisture, and an escape valve $V_{13}$ is mounted on the branch pipe S. Switch-over valves $V_{11}$ and $V_{12}$ and a purging pipe Pn are provided immediately at the upstream side of the semiconductor manufacturing line SM. The arrangements in FIG. 4 are identical with those in FIG. 1, except that the apparatus for the generation of moisture of the second example is provided with the aforesaid branch pipe S, escape valve $V_{13}$, switch-over valves $V_{11}$ and $V_{12}$, and purging pipe Pn. Description of duplicated parts is omitted.

Referring to FIG. 4, nitrogen is fed to the semiconductor manufacturing line SM through the purging pipe Pn for the nitrogen purging. Before moisture is supplied to the semiconductor manufacturing line SM, specific amounts of oxygen and hydrogen are fed into the reactor for the generation of moisture. The amount of moisture generated in the startup of moisture generation, which is equivalent to the volume produced at the peak point of moisture as generated, is discharged through the escape valve $V_{13}$ which is left open. When the concentration of generated moisture has been stabilized, the aforesaid escape valve $V_{13}$ is closed, the switch-over valve $V_{11}$ is closed, and the switch-over valve $V_{12}$ is opened to lead generated moisture to the semiconductor manufacturing line SM at a specific rate.

EXAMPLE 3

Figure 5:
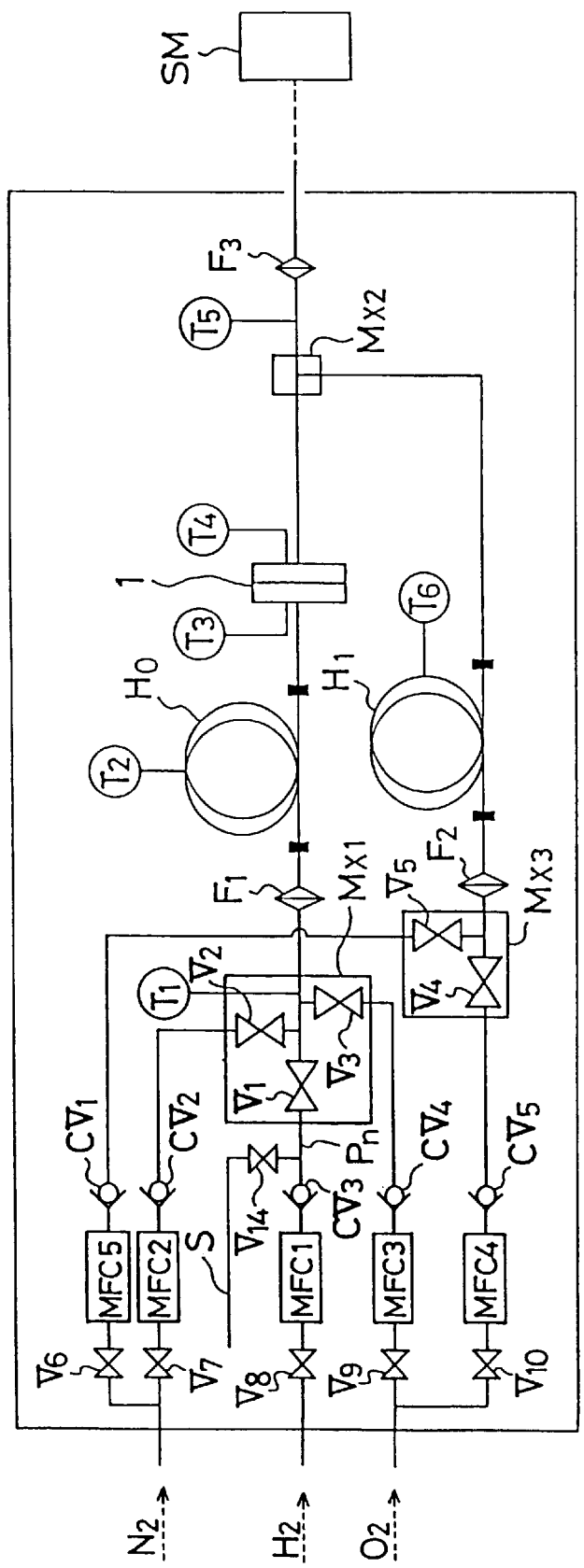
FIG. 5 is a system diagram of a moisture generator to practice the third example of the present invention.

FIG. 5 shows the arrangements of the apparatus for the generation of moisture used in the third example of the present invention. In this third example, a branch pipe S is connected to the line on the outlet side of the mass flow controller $MFC_1$ for feeding hydrogen. An escape valve $V_{14}$ is provided on the branch pipe.

Before moisture begins to be generated, hydrogen—trapped in the interior spaces of a valve $V_8$, mass flow controller $MFC_1$, and valve $V_1$—is discharged through escape valve $V_{14}$. When the flow rate of hydrogen has been regulated to a specific level of hydrogen to be fed to the reactor, the escape valve $V_{14}$ is closed to lead hydrogen into the reactor 1 for the generation of moisture.

In the present example, escape valve V14 is left open beforehand. In this way, excessive pressure of hydrogen trapped in the mass flow controller $MFC_1$ and the pipe line is discharge almost completely. Then, when hydrogen is fed into the reactor 1 for the generation of moisture, there will be no sudden rush of hydrogen into the reactor 1, as in the prior art apparatus for the generation of moisture depicted in FIG. 6.

That is, when the flow of hydrogen has been stabilized at a specific flow level preset by the mass flow controller $MFC_1$, hydrogen is fed into the reactor 1 through a valve $V_1$. Therefore, the flow of moisture from the reactor 1 can be controlled with a very high degree of precision, even if the flow is very small.

In the embodiment shown in FIG. 5, a so-called oxygen-rich moisture generation is described. It goes without saying that just as the first embodiment shown in FIGS. 1 and 2, the process of the embodiment shown in FIG. 5 is applicable to the so-called hydrogen-rich moisture generation, and also to the operation in which hydrogen and oxygen are fed at the ratio of 2:1 to produce and discharge substantially only moisture out of the moisture outlet.

In the case of moisture generation under hydrogen-rich conditions, a branch pipe S is provided on the downstream side of a flow controller $MFC_3$ for oxygen. Excessive pressure of oxygen trapped between the flow controller $MFC_3$ and the valve $V_3$ is discharged in advance through the branch pipe S and the escape valve. Sudden flow of oxygen into the reactor 1 is prevented in that way when oxygen feeding commences. When the flow of oxygen has been stabilized to a specific level, oxygen is introduced into the reactor 1. It is confirmed that in this way, the flow of moisture can be controlled with very high precision, even when the supply of moisture is very small in a hydrogen-rich generation.

EFFECT OF THE INVENTION

The present invention in a first claimed embodiment is configured so that the feeding of hydrogen into the reactor for the generation of moisture is gradually increased to a specific level by means of a flow controller. That precludes a possible sudden rush of hydrogen trapped in interior spaces of the flow controller and hydrogen pipe line into the reactor, which occurs when fresh hydrogen is supplied to the inlet side of the flow controller. That is, there will be no concern that the generation of moisture will rise out of control if the generated amount is very small. Thus the production of moisture, although very small, can be controlled with a very high degree of precision.

The present invention in a third claimed embodiment is configured so that the feeding of oxygen into the reactor for the generation of moisture is gradually increased to a specific level by means of a flow controller in the same manner as the first claimed embodiment. Therefore, the production of moisture can be controlled with a very high degree of precision, even if a very small amount of moisture is generated under hydrogen-rich conditions.

The present invention in a fifth claimed embodiment is configured so that moisture is first generated in the reactor for the generation of moisture and an amount of moisture produced at the peak point of moisture generation in the initial stage of the operation is discharged to the outside through an escape valve. The supply of moisture to the line SM begins when moisture generation has been stabilized. Thus, the production of moisture, though very small, can be controlled with very high precision.

The present invention in a sixth claimed embodiment is configured so that a branch pipe to permit hydrogen to escape is provided on the outlet side of the flow controller that controls the flow of hydrogen. An escape valve is left open before hydrogen is fed into the inlet side of the reactor for the generation of moisture so that excessive pressure of hydrogen trapped inside is release through the escape valve. That can easily prevent the hydrogen remnants from suddenly flowing into the rector, in contrast to the prior art. Under this arrangement, there will arise no peak of moisture concentration in the initial stage, and even if a small amount of moisture is generated under oxygen-rich conditions, the supply to the semiconductor manufacturing line can be controlled with high precision.

The present invention in a seventh claimed embodiment is configured so that a branch pipe to allow oxygen to escape is provided on the outlet side of the flow controller which controls the feeding of oxygen. As in the fifth claimed embodiment, the oxygen remnants are prevented from rushing into the reactor. As a result, it is possible to control an amount of moisture as generated with an extremely high degree of precision, even if moisture of a small amount is generated under hydrogen-rich conditions.

As illustrated, the present invention is highly practical.
What is claimed is:
1. A process of supplying moisture or a mixture of moisture with oxygen from a reactor to a semiconductor manufacturing line at a set, low flow rate, comprising feeding, at a temperature lower than the ignition point, oxygen and hydrogen into a reactor provided with a platinum coating on an interior wall whereby the oxygen reacts instantaneously with the hydrogen at a temperature lower than the ignition point to produce moisture without undergoing combustion at a high temperature;
    wherein the flow rate of hydrogen supplied to said reactor is controlled by means of a flow controller in such a way that while oxygen is kept flowing at a set flow rate, the supply of hydrogen to the reactor is started and gradually increased and reaches a specific set level in a specific time after the start of the feeding of hydrogen; and
    wherein the flow controller is so controlled that the flow rate of hydrogen is raised at an approximately fixed rate of increase and reaches a specific set level in a specific time, wherein said specific time for the set flow rate level to be reached is in the range of one to ten seconds.

2. A process of supplying moisture or a mixture of moisture with hydrogen from a reactor to a semiconductor manufacturing line at a set, low flow rate, comprising feeding, at a temperature lower than the ignition point, oxygen and hydrogen into a reactor provided with a platinum coating on an interior wall whereby the oxygen reacts instantaneously with the hydrogen at a temperature lower than the ignition point to produce moisture without undergoing combustion at a high temperature;
    wherein the flow rate of oxygen supplied to said reactor is controlled by means of a flow controller in such a way that while hydrogen is kept flowing at a set flow rate, the supply of oxygen to the reactor is started and gradually increased and reaches a specific set level in a specific time after the start of the feeding of oxygen; and
    wherein the flow controller is so controlled that the flow rate of oxygen is raised at an approximately fixed rate of increase and reaches a specific set level in a specific time, wherein said specific time for the set flow rate level to be reached is in the range of one to ten seconds.

3. A process of supplying moisture from a reactor to a semiconductor manufacturing line at a low flow rate, comprising feeding, at a temperature lower than the ignition point, oxygen and hydrogen into a reactor provided with a platinum coating on an interior wall whereby the oxygen reacts instantaneously with the hydrogen at a temperature lower than the ignition point to produce moisture without undergoing combustion at a high temperature
    wherein an escape pipe provided with an escape valve is branched out from an outlet side of the reactor and, first, with the escape valve open, oxygen and hydrogen are fed into the reactor at specific rates to produce in advance a specific amount of moisture in the reactor and, subsequently, with the escape valve closed, moisture or a mixture of moisture with oxygen or hydrogen is supplied from the reactor to the semiconductor manufacturing line at a set flow rate.

4. A process of supplying moisture from a reactor to a semiconductor manufacturing line at a low flow rate, comprising feeding, at a temperature lower than the ignition point, oxygen and hydrogen into a reactor provided with a platinum coating on an interior wall whereby the oxygen reacts instantaneously with the hydrogen at a temperature lower than the ignition point to produce moisture without undergoing combustion at a high temperature wherein an escape pipe provided with an escape valve is branched off from an outlet side of a flow rate controller for control of the flow rate of hydrogen supplied to the reactor and, while oxygen is being supplied at a set flow rate, the escape valve is first opened and hydrogen is fed, thereby lowering the pressure on the secondary side of the flow rate controller and, subsequently, the escape valve is closed to feed hydrogen into the reactor, whereby moisture or a mixture of moisture with oxygen is supplied from the reactor to the semiconductor manufacturing line at a set flow rate.

5. A process of supplying moisture from a reactor to a semiconductor manufacturing line at a low flow rate, comprising feeding, at a temperature lower than the ignition point, oxygen and hydrogen into a reactor provided with a platinum coating on an interior wall whereby the oxygen reacts instantaneously with the hydrogen at a temperature lower than the ignition point to produce moisture without undergoing combustion at a high temperature wherein an escape pipe provided with an escape valve is branched off from an outlet side of a flow rate controller for control of the flow rate of oxygen supplied to the reactor and, while hydrogen is being supplied at a set flow rate, the escape valve is first opened and oxygen is fed, thereby lowering the pressure on the secondary side of the flow rate controller and, subsequently, the escape valve is closed to feed oxygen into the reactor, whereby moisture or a mixture of moisture with hydrogen is supplied from the reactor to the semiconductor manufacturing line at a set flow rate.

* * * * *